United States Patent
Karenfeld

[11] 3,902,522
[45] Sept. 2, 1975

[54] PRESSURE REDUCER
[75] Inventor: Anton Karenfeld, Mosbach, Germany
[73] Assignee: Braukmann Armaturen AG, Rothrist, Switzerland
[22] Filed: Jan. 16, 1973
[21] Appl. No.: 324,197

[52] U.S. Cl. ..... 137/484.6; 137/505.26; 137/505.18
[51] Int. Cl.² ........................................ F16K 17/34
[58] Field of Search .......... 137/484.2, 484.4, 484.6, 137/484.8, 505.26, 505.29, 505.3, 137/505.36, 505.18

[56] References Cited
UNITED STATES PATENTS
| | | | |
|---|---|---|---|
| 847,944 | 3/1907 | Mayer | 137/484.8 |
| 2,707,966 | 5/1955 | Taplin | 137/484.8 X |
| 2,806,481 | 9/1957 | Faust | 137/484.8 X |
| 2,880,751 | 4/1959 | Tobis | 137/484.2 X |
| 3,601,148 | 8/1971 | Jeffrey | 137/484.8 |

*Primary Examiner*—Harold W. Weakley
*Attorney, Agent, or Firm*—William Anthony Drucker

[57] ABSTRACT

A fluid pressure reducer has an inlet and outlet chamber connected by a passageway which also provides a valve seat; an annular wall extends into the passageway short of the valve seat to provide a constriction. The valve seat is closable by a valve member carried by a spindle to which is secured a relief piston which rides in the annular wall. The end of the annular wall removed with respect to the valve seat is closed by a spring loaded diaphragm to provide an after pressure chamber which communicates with the outlet chamber by means of a bore. The spindle extends through the diaphragm in sealed relationship.

4 Claims, 3 Drawing Figures

PRESSURE REDUCER

FIELD OF INVENTION

This invention relates to fluid pressure reducers.

SUMMARY OF THE INVENTION

The pressure reducer of the invention has an inlet and an outlet chamber and a first annular wall between the inlet and outlet chamber which defines a first passage means to permit fluid under pressure to flow from the inlet to the outlet chamber. One end of the first annular wall provides a valve seat and a valve member bears on the valve seat. Extending into the first annular wall but terminating short of the valve seat is a second annular wall, thus providing with the first annular wall a constriction to increase the speed of flow between the inlet and outlet chambers with a consequent reduction in pressure. A spindle carries the valve member and extends into the second annular wall where it carries a piston engageable with the inside of the second annular wall. The drop in pressure causes displacement of the relief piston along with the valve and permits the passage of the fluid, the pressure of which is to be reduced. The second annular wall is closed at the end removed from the valve seat by a spring loaded diaphragm, thus providing an after-pressure chamber between the relief piston and the diaphragm. This after-pressure chamber is connected by a bore to the outlet chamber, the pressure prevailing in the latter being eventually established in the after pressure chamber and thereby on the upper side of the relief piston removed from the valve seat.

BRIEF DESCRIPTION OF THE DRAWINGS

The invention will now be described in relation to the accompanying drawings in which.

DESCRIPTION OF A PREFERRED EMBODIMENT

Figure 1:
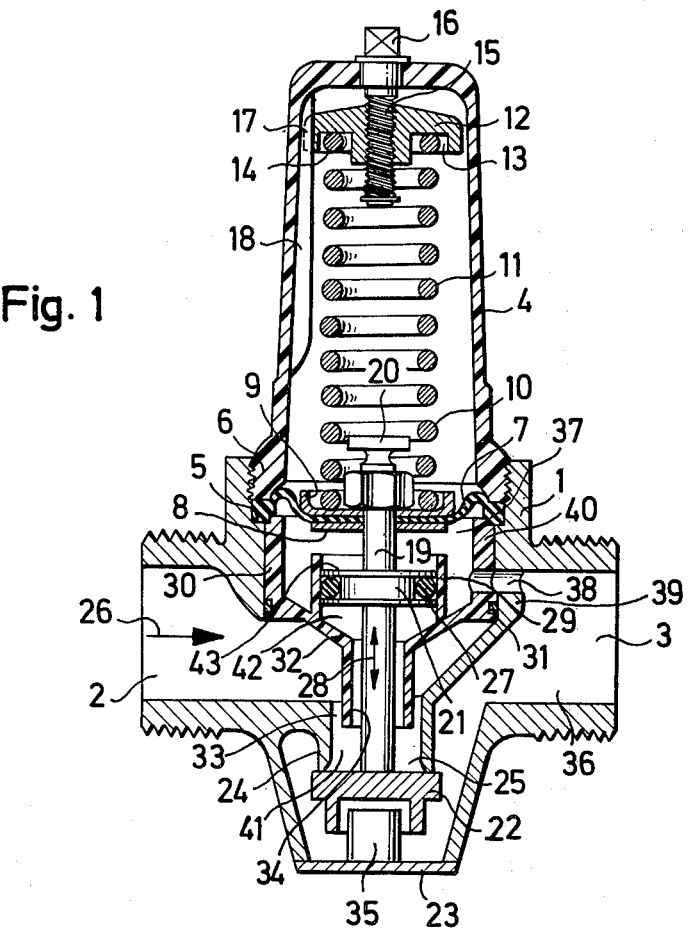
FIG. 1 is a vertical cross section through a pressure reducer constructed in accordance with the invention.

The pressure reducer of the invention has a housing 1 with an inlet chamber 2, an outlet chamber 3 and a cover 4. The housing 1 has a shoulder 5 which is adapted to receive the lower end of the cover 4 and secure in place the reinforced edge of a diaphragm 7. A lower reinforcing plate 8 and an upper reinforcing disc 9 are carried by the diaphragm 7. The disc 9 provides a support for the lower end of a loading spring 11.

The annular groove 13 of a pressure member 12 engages the upper end 14 of the spring 11; the threaded portion of a screw 15 extends through the pressure member 12. The screw 15 extends outwardly through the cover 4 and is provided with an enlarged head 16. Rotation of the screw 15 by application of a tool to the enlarged head 16 changes the pressure on the spring 11. The pressure member 12 has a groove 17 which is engageable with a rib 18 on the cover 4 and their interaction prevents turning of the pressure member.

The diaphragm 7 is traversed in sealed relationship by a valve spindle 19 having a head 20 which is provided simply to facilitate its extraction if necessary. A relief piston 21 is carried on the spindle 19 and the latter terminates in a valve member 22 engageable with a valve seating formed by the end of a tubular housing part 24 which also provides a nozzle 25.

An insert 30 is located in the housing 1 being sealed therein by an 'O' ring 31. The insert 30 surrounds the spindle 19; the insert 30 has a portion 32 of reduced diameter which extends into the tubular housing part 24 but terminates short of the valve seat thereby providing a chamber 41.

The reduced portion 32 of the insert 30 forms with the tubular housing part 24 a constricted passageway 33; as a result when fluid flows from the inlet chamber 2 through to the outlet chamber 3 with the valve 22 open, an increase in flow occurs with the consequent reduction of pressure.

The insert 30 has an integral upwardly extending internal wall 29 positioned above the reduced portion 32; the wall 29 provides a relief cylinder in which a relief piston 21 rides upwardly and downwardly. It will be observed that the diaphragm 7, the insert 30 and the relief piston 21 form a chamber 37 which is connected to the outlet chamber 3 by a bore 38. As a result pressure changes in the outlet chamber 3 are ultimately established in chamber 37 and the latter can thus be called an "after-pressure" chamber.

The operation of the pressure reducer is as follows; with fluid flowing through the housing and the valve member 22 open, the effect of the constriction is to increase the flow. As a result pressure drops in chamber 31 and pressure on the underside of the relief piston 21 is correspondingly reduced. This leads to further opening of the valve 22 and hence changes in pressure at the inlet end can be easily accommodated.

The constriction shown in FIG. 1 in the region of the valve 22 is formed by the straight wall of the tubular housing part 24 with the similar wall of the reduced portion 22 of the insert 30. However, other configurations to provide the constrictions can be employed as illustrated in FIGS. 2 and 3.

Figure 2:
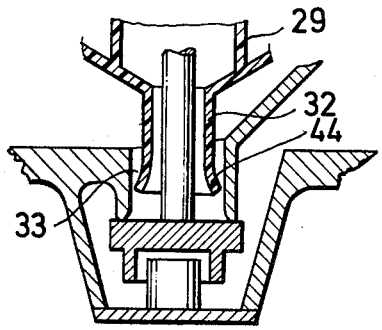
FIGS. 2 and 3 are vertical cross-sections showing alternative configurations which may be employed to provide the constriction (adjacent to the valve seat) which is shown in FIG. 1.
Figure 3:
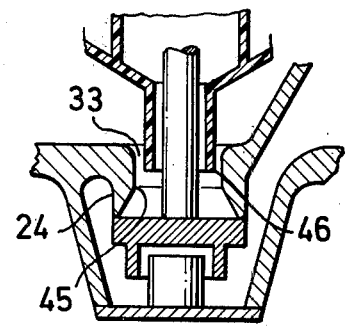

Thus, in FIG. 2 the reduced portion of the insert is flared as at 44 while in FIG. 3 the tubular housing part is flared as at 45.

I claim:

1. A fluid pressure reducer comprising a housing having an inlet and an outlet chamber, a first annular wall defining passage means through which fluid under pressure may flow from said inlet chamber to said outlet chamber; said passage means providing a valve seat, a valve member bearing on said valve seat, a second annular wall extending into said first annular wall but short of said valve seat to provide a constriction in flow between said inlet and outlet chambers, a relief piston engageable with the inside of said second annular wall, means connecting said relief piston to said valve whereby said relief piston and said valve are displaceable away and towards said valve seat to accommodate pressure differences between said inlet and said outlet chamber.

2. A fluid pressure reducer according to claim 1 wherein said second annular wall is closed by a flexible diaphragm at the end removed from said valve seat to provide an after pressure chamber between said relief piston and said diaphragm.

3. A pressure reducer according to claim 2 wherein said diaphragm is spring loaded and said connecting means is a spindle which extends through said diaphragm in sealed relationship.

4. A pressure reducer according to claim 2 wherein a passageway connects said after-pressure chamber with said outlet chamber.

* * * * *